(12) United States Patent
Dermosessian (10) Patent No.: US 12,468,567 B2
(45) Date of Patent: Nov. 11, 2025

(54) GENERATING HIGH RESOLUTION TIME STAMPS IN A VERY HIGH VOLUME TRANSACTION REQUEST ENVIRONMENT

(71) Applicant: Plemicor Holdings Canada Inc., Montreal (CA)

(72) Inventor: Garo Dermosessian, Montreal (CA)

(73) Assignee: PLEMICOR HOLDINGS CANADA INC., Montreal (CA)

( * ) Notice: Subject to any disclaimer, the term of this patent is extended or adjusted under 35 U.S.C. 154(b) by 425 days.

(21) Appl. No.: 18/196,869

(22) Filed: May 12, 2023

(65) Prior Publication Data

US 2023/0367626 A1 Nov. 16, 2023

Related U.S. Application Data

(60) Provisional application No. 63/341,095, filed on May 12, 2022.

(51) Int. Cl.
*G06F 9/46* (2006.01)
*G06F 11/30* (2006.01)

(52) U.S. Cl.
CPC .......... *G06F 9/466* (2013.01); *G06F 11/3065* (2013.01)

(58) Field of Classification Search
None
See application file for complete search history.

(56) References Cited

U.S. PATENT DOCUMENTS

| | | | |
|---|---|---|---|
| 8,910,188 B1 | 12/2014 | Wang et al. |
| 9,697,170 B2 | 7/2017 | Nixon et al. |
| 9,929,743 B1 | 3/2018 | Acuña-Rohter et al. |
| 10,514,952 B2 | 12/2019 | Park et al. |
| 10,896,068 B1 | 1/2021 | Frandzel et al. |
| 10,902,654 B2 | 1/2021 | McRaven et al. |
| 10,963,189 B1 | 3/2021 | Neelakantam et al. |
| 11,061,722 B2 | 7/2021 | Park et al. |
| 11,140,084 B2 | 10/2021 | Hall et al. |
| 11,310,317 B1 | 4/2022 | Sajeepa et al. |
| 11,558,300 B1 | 1/2023 | Prabagaren |
| 2011/0055368 A1 | 3/2011 | Colrain et al. |
| 2019/0394096 A1 | 12/2019 | Bernat et al. |
| 2020/0045134 A1 | 2/2020 | Rozas |

(Continued)

FOREIGN PATENT DOCUMENTS

WO 2021154391 8/2021

*Primary Examiner* — Craig C Dorais
(74) *Attorney, Agent, or Firm* — Benoit&Cote Inc.; C. Marc Benoit (57) ABSTRACT

A method for assigning unique timestamps to transaction requests in a serverless architecture is provided. The method comprises receiving a plurality of transaction requests each having an initial timestamp; batching the initial transaction requests into initial batches using a batch processing module; distributing the initial batches to at least one timestamp assignment module using a load balancing module; and replacing the initial timestamp with a unique timestamp for each transaction request in each initial batch to generate an advanced batch according to an order in which the transaction requests are ordered in the initial batches using the timestamp assignment module, wherein the unique timestamp has an advanced precision of at least 1 nanosecond, the advanced precision of the unique timestamp being higher than an initial precision of the initial timestamp. A system having a serverless architecture for assigning unique timestamps is provided.

17 Claims, 4 Drawing Sheets

(56) References Cited

U.S. PATENT DOCUMENTS

| | | |
|---|---|---|
| 2021/0117360 A1 | 4/2021 | Kutch et al. |
| 2021/0173675 A1 | 6/2021 | Rose |
| 2021/0263779 A1 | 8/2021 | Haghigha et al. |
| 2022/0116398 A1 | 4/2022 | Rose |
| 2022/0188332 A1 | 6/2022 | Weaver et al. |

| ID | DATE | HR | MIN | SEC | Millisec. |

305

| ID | DATE | HR | MIN | SEC | Millisec. | Microsec. | Nanosec. |

315

GENERATING HIGH RESOLUTION TIME STAMPS IN A VERY HIGH VOLUME TRANSACTION REQUEST ENVIRONMENT

RELATED APPLICATION

The present application claims priority to or benefit of U.S. provisional patent application No. 63/341,095, filed May 12, 2022, which is incorporated herein by reference in its entirety.

FIELD

The subject matter disclosed generally relates to the generation of time stamps. More particularly, the subject matter disclosed relates to methods and systems to generate high resolution unique time stamps and associated instantaneous passwords with a precision of microseconds or less.

BACKGROUND

When a large number of transactions are processed in a short period of time, distinguishing between two or several transactions, and, more importantly, between the time of processing of the transactions, may be difficult. Existing servers have a certain time resolution to handle present day issues. It would be desirable to design servers and methods capable of handling higher time resolution.

SUMMARY

According to one aspect of the disclosed technology, there is provided a system, having a serverless architecture for assigning unique timestamps, the system comprising: a receiving module configured to receive and to sequence initial transaction requests with a first in first out (FIFO) logic, the initial transaction requests having assigned initial timestamps; a batch processing module configured to batch-group the initial transaction requests into initial batches based on the FIFO logic; at least one timestamp assignment module configured to assign a unique timestamp to each transaction request of the initial batch and to generate an advanced batch based on the initial batch by replacing an initial timestamp of each initial transaction request by the unique timestamp, the advanced batch being generated according to an order in which the initial transaction requests are sequenced in the initial batch, and an advanced time resolution of the unique timestamp being greater than an initial time resolution of the initial timestamp; and a load balancing module configured to distribute the initial batches with the initial transaction requests across the at least one timestamp assignment module, such that the serverless architecture processes at least 1,000,000 transactions per second. In at least one embodiment, the unique timestamp has an advanced precision of at least one nanosecond.

In at least one embodiment, the load balancing module distributes the initial batches to the at least one timestamp module according to availability of resources or in a round-robin fashion. The batch processing module may be configured to group the initial transaction requests in each initial batch according to one or more predetermined criteria. The load balancing module may be further to dynamically adjust the distribution of the initial transaction requests among the at least one of the timestamp assignment module based on a workload and availability of each timestamp assignment module.

In at least one embodiment, the system may comprise a database operation module which is configured to generate a report of the unique timestamps and their corresponding transaction requests for a specified time period. A buffer batch size of the batch processing module may be in the order of hundreds and more transmissions depending on the size of the unit transition and the load handling capacity of the allocated batches. The at least one timestamp assignment module may be further configured to detect the initial transaction requests that have duplicate initial timestamps.

According to another aspect of the disclosed technology, there is provided a method for assigning unique timestamps to transaction requests in a serverless architecture comprising: receiving a plurality of transaction requests each having an initial timestamp; batching the initial transaction requests into initial batches using a batch processing module; distributing the initial batches to at least one timestamp assignment module using a load balancing module; and replacing the initial timestamp with a unique timestamp for each transaction request in each initial batch to generate an advanced batch according to an order in which the transaction requests are ordered in the initial batches using the timestamp assignment module, wherein the unique timestamp has an advanced precision of at least 1 nanosecond, the advanced precision of the unique timestamp being higher than an initial precision of the initial timestamp.

In at least one embodiment, the unique timestamp has an advanced precision of at least 10 nanoseconds. The method may further comprise distributing the initial batches to the at least one timestamp module according to availability of resources or in a round-robin fashion. The method may further comprise grouping the transaction requests in each initial batch according to one or more predetermined criteria. The method may further comprise dynamically adjusting the distribution of the transaction requests among timestamp assignment modules based on the workload and availability of each timestamp assignment module. The method may comprise generating a report of the unique timestamps and their corresponding transaction requests for a specified time period. A buffer batch size of the batch processing module may be in the order of hundreds and more transmissions depending on the size of the unit transition and the load handling capacity of the allocated batches. The at least one timestamp assignment module may be configured to detect the initial transaction requests that have duplicate initial timestamps.

According to another aspect of the disclosed technology, there is provided a system having a serverless architecture for assigning unique timestamps, the system comprising: a receiving module configured to sequence initial transaction requests, where the initial transaction requests have assigned initial timestamps with an initial time resolution; a batch processing module configured to group the initial transaction requests into initial batches; and a timestamp assignment module configured to assign a unique timestamp to at least initial transaction requests that have duplicate initial timestamps, wherein the unique timestamps have an advanced time resolution which is greater than the initial time resolution. According to an embodiment, the sequencing conforms to a first in first out (FIFO) logic and the batch processing module is configured to batch-group the initial transaction requests into initial batches based on the FIFO logic. In at least one embodiment, the load balancing module distributes the initial batches to the timestamp module according to availability of resources or in a round-robin fashion. The batch processing module may be configured to group the initial transaction requests in each initial batch according to one or more predetermined criteria. The load balancing module may be further to dynamically adjust the distribution of the initial transaction requests among the at least one of the timestamp assignment module based on a workload and availability of each timestamp assignment module. In at least one embodiment, the system may comprise a database operation module which is configured to generate a report of the unique timestamps and their corresponding transaction requests for a specified time period. A buffer batch size of the batch processing module may be in the order of hundreds and more transmissions depending on the size of the unit transition and the load handling capacity of the allocated batches.

A method for assigning unique timestamps to transaction requests in a serverless architecture is provided herein. In at least one embodiment, the method comprises receiving a plurality of transaction requests each having an initial timestamp; batching the initial transaction requests into initial batches using a batch processing module; distributing the initial batches to at least one timestamp assignment module using a load balancing module; and replacing the initial timestamp with a unique timestamp for each transaction request in each initial batch to generate an advanced batch according to an order in which the transaction requests are ordered in the initial batches using the timestamp assignment module, wherein the unique timestamp has an advanced precision of at least 1 nanosecond, the advanced precision of the unique timestamp being higher than an initial precision of the initial timestamp. A system having a serverless architecture for assigning unique timestamps is also provided herein.

BRIEF DESCRIPTION OF THE DRAWINGS

Further features and advantages of the present disclosure will become apparent from the following detailed description, taken in combination with the appended drawings, in which.

DETAILED DESCRIPTION

The realizations will now be described more fully hereinafter with reference to the accompanying figures, in which realizations are illustrated. The foregoing may, however, be embodied in many different forms and should not be construed as limited to the illustrated realizations set forth herein.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words "about", "approximately", or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language ("e.g.," "such as", or the like) provided herein, is intended merely to better illuminate the exemplary realizations and does not pose a limitation on the scope of the realizations. No language in the specification should be construed as indicating any unclaimed element as essential to the practice of the realizations. The use of the term "substantially" is intended to mean "for the most part" or "essentially" depending on the context. It is to be construed as indicating that some deviation from the word it qualifies is acceptable as would be appreciated by one of ordinary skill in the art to operate satisfactorily for the intended purpose.

In the following description, it is understood that terms such as "first", "second", "top", "bottom", "above", "below", and the like, are words of convenience and are not to be construed as limiting terms.

The terms "top", "up", "upper", "bottom", "lower", "down", "vertical", "horizontal", "interior" and "exterior" and the like are intended to be construed in their normal meaning in relation with normal installation of the product, with normal installation of the components being depicted on FIGS. 1 to 8.

It should further be noted that for purposes of this disclosure, the terms "coupled" and "connected" mean the joining of two members directly or indirectly to one another. Such joining may be stationary in nature or movable in nature and/or such joining may allow for the flow of electricity, electrical signals, or other types of signals or communication between two members. Such joining may be achieved with the two members, or the two members and any additional intermediate members, being integrally formed as a single unitary body with one another or with the two members or the two members and any additional intermediate members being attached to one another. Such joining may be permanent or alternatively removable or releasable.

Time is money. The infinitesimals of time and money can be organized to avoid losing either unnecessarily. It is clear, that time is more distinct in its infinitesimals. Times of the day are the hours, minutes, and the seconds. Seconds are further split to deci, centi, milli, micro, nano, pico, femto, atto, zepto, yocto and Plank times seconds. A nano second is a billionth of a second as reference and everything that follows is split further to a fraction of a thousandths of the nano second except the plank time which is the defined absolute time so far. Everything which is after the nano, is a fraction of the nano by a thousand time. Nano second is written as 10-12 of a second, hence a pico is 10-15 of a second, and micro is 10-6 of a second as everything which is before the nano, is a multiple of the nano by a thousand time and hence microsecond is 10-6 of a second and a millisecond is 10-3 of a second.

There are twenty-four hours in a day, sixty minutes in an hour, and sixty seconds in an hour. This makes the number of seconds in a day equal to 24×60×60=86,400 seconds. The number of nanoseconds, microseconds and milliseconds in a day are:
  a. nanoseconds: 86,400×1,000,000,000=86,400,000,000,000 nanoseconds.
  b. microseconds: 86,400×1,000,000=86,400,000,000 microseconds
  c. milliseconds: 86,400×1000=86,400,000 milliseconds.

The number of seconds that all humans on this planet have during a day, assuming a total rounded figure of the population on earth is eight billion (8,000,000,000) then, the total number of seconds humans spend in a day is:

86,400×8,000,000,000=691,200,000,000,000 seconds.

An object of the methods and systems described herein is to optimize the yield of this available amount of time in seconds and its infinitesimal fractions to the best extent possible with present and future technologies and transform it, the infinitesimal fractions of time, using seamless, flawless and user friendly applications and transform these into currency/money, FAT, CRYPTO, META, NFT, digital and in any other types, forms, modes, methods, applications, present and future in all its kinds and structures and create a reward scheme which is diffused to the users of the means, applications, facilities, modes and methods described herein.

Present facilities of handling financial transactions and money service business providers use data centers and manage financial transactions are of considerable magnitude, nevertheless the systems herein need bigger data recording, monitoring, and handling networks and facilities.

One such Money Service Provider has created a facility which can manage 50,000 financial transactions a second. With this value in hand, the number of possible financial transactions that may be achieved using this type of data handling facility, assuming that users may visit the service provider's website (or use the service provider's application) around the clock, 24 hours a day and 3600 seconds per hour during a day, one may obtain a total financial data handling capacity of:

24×3600×50,000=4,320,000,000 user visits per day.

If, for example, the website of the Money Service Provider was to be visited by the global total population at least once a day, the store would need to double the capacity of the present capacity of 50,000 financial transactions available capacity and much more if the global users are allowed to visit the website more often during a day.

This may require a server that can manage much more traffic and allow the seamless handling of received data, organizing, classifying, sorting, defining, and implementing the relevant functions, rewards, filters and other aspects and algorithms, notify reward and other functions eligible users, verify validate and confirm eligibilities and eventually execute the reward and other instructions within the identified algorithms and parameters.

Having said the above, the capacity of a system as described herein, considering global traffic, may require:

8,000,000,000/3600=2,222,222 visits per second per single visit of all users if the users were to decide to visit the website or the application during one hour of the day.

8,000,000,000/24×3600=92,593 visits per second per single visit of all users if the users were to decide to visit the website or the application during the twenty-four hours of the day.

This number of 92,593 visits per second and its multiples may necessitate the use of data handling and operating servers that can manage the multiples of this figure particularly when user multiple visits during nominated times are initiated and transmitted to the special purpose server or the system as described herein.

The total activity of simultaneously managing this load may include receiving the visits of the users, managing their input, classifying, sorting, notifying, verifying, registering and other activities of approving, transfers of funds or other aspects and associated internet and IT activities which may need a much broader load handling and server capacities.

Currently available (conventional) time data handling technologies can manage time data at the 100 nanosecond resolution range. This is the defragmentation of the second the currently available technology can do. In other words, the conventional technologies can detect and record time tick activities.

The core issue here besides the time tick resolution, is the capacity of data handling of the servers associated with the time ticks of user multiple visits.

If the above figures of 92,593 visits per second are to be considered globally and the activities involved per visit would be transmission, receipt, registration, confirmation, classification, notification, approval and transfer operations and each at a certain load of an average of 0.1 Kbits, then the load capacity of the server may be in the range of: number of activities: 10; number of visits per second: 92,593; load: 0.1 kilobytes (Kb) per visit; total load per second: 92,593×10×0.1=92,593 Kb; total load per second: 92,593/1000=92.6 megabytes (Mb); total load in one hour: 92.6×3600=333,360 Mb; total load in one hour: 333.36 gigabytes (Gb); total server capacity: 5×333.36/1000=1.67 megawatt (MW). The required server capacity needs to be in the range of 2 MW for one use. For redundancy, back up, safety issues, this requirement is fivefold, which necessitates the use of at least 10 MW capacity data centers for a single visit of the user. For additional visits per user, the required capacities may be the multiples of this figure. Present capacity data centers can manage this type of loads.

The focal issue is the ability of data centers to register peak hour traffic and congestion. This is explained with the above figures namely the two figures of 92,593 visits per second during the load spread on 24 Hours of visits during a day, or the peak of 2,222,222 rush hours visits if the users would be allowed to have access to the single application during such rush hour times. In such a case, the capacity of the serves would be 24 times more than the above analysis which means 24×10=240 MW of a data center capacity which are figures that are within the present technology capabilities.

The main problem with the conventional technology is not the load capacity of the servers, but the time capacity limitations of servers. Whereas the 92,593 visits per second is attainable considering the existence of the 50,000 visits per second visits achieved in other present application, 2,222,222 visits per second, however, are not manageable by the available technologies at this moment. The system and the methods described herein are provided as a solution to such a problem. Therefore, the system and methods as described herein generate high-resolution timestamps (also referred to herein as a unique timestamp).

Figure 1:
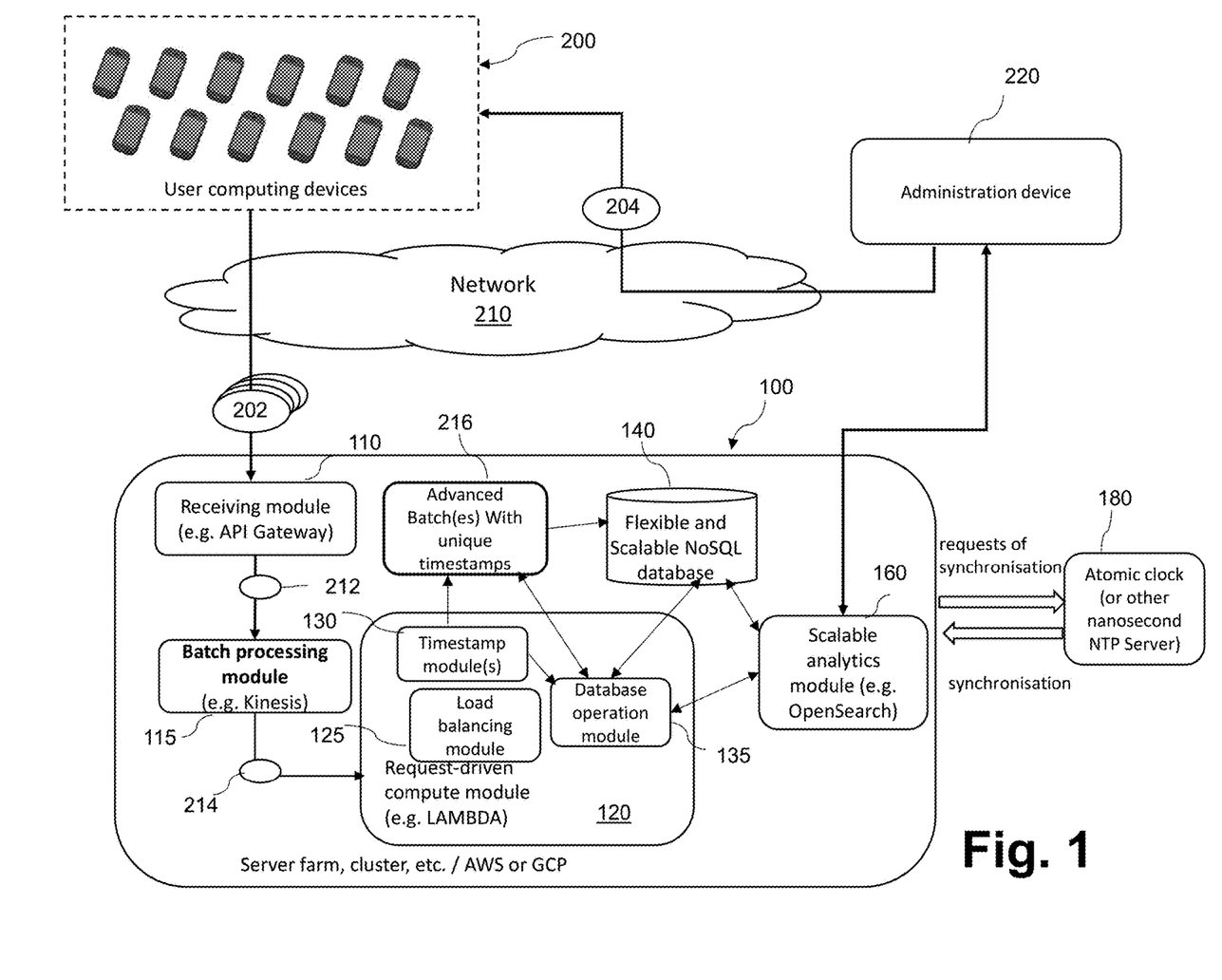
FIG. 1 is a schematic block diagram of a system for assigning unique timestamps to transaction requests, in accordance with at least one embodiment of the present disclosure.

Referring now to FIG. 1, there is provided a system 100 for assigning unique timestamps to transaction requests, in accordance with at least one embodiment of the present disclosure.

In at least one preferred embodiment, the system 100 has a serverless architecture. The system 100 comprises a receiving module 110, a batch processing module 115, and a request-driven computer module 120 (which may be a part of and/or executed by a request-driven computer service). The request-driven computer module 120 comprises a timestamp assignment module 130 and a database operation module 135.

Modules of the system 100 as described herein refer to hardware where the instructions of the software are executed. The modules of the system 100 are located in one server or server farm or cluster, such as, for example, Amazon™ Web Services (AWS™) or Google Cloud Platform (GCP). In some non-limiting embodiments described herein, the system 100 may be a server and may be referred to as "special service server".

The receiving module 110 is configured to receive and to sequence a plurality of initial transaction requests 202 (also referred to herein as "transaction requests") having an initial timestamp with a first in first out (FIFO) logic. The receiving module 110 may be executed, for example, by an API Gateway (such as, for example, Amazon™ API). The API Gateway may, for example, manage an application programming interface (API), which may securely connect and integrate with other services that execute modules of the present disclosure. For example, the API Gateway may be connected and securely communicate with Lambda (such as, for example, Amazon™ Lambda), a database 140 (such as, for example, Amazon DynamoDB). The receiving module 110 transmits a sequence of transactions 212 to the batch processing module 115.

The batch processing module 115 may execute instructions at a real-time streaming service. The batch processing module 115 is configured to batch-group the initial transaction requests 202 received in a sequence 212 into initial batches 212 (in at least one embodiment, based on the FIFO logic). The batch processing module 115 receives, processes, and forwards the batches. The real-time streaming service may be, for example, Amazon™ Kinesis Data of Amazon™ Kinesis, which is a real-time data streaming service provided by AWS. The batch processing module 115 is configured to ingest and process large amounts of streaming data in real-time, enabling the system 100 (for example, scalable analytics module 160) to analyze data and, for example, the administration device 220 (and/or, for example, its operator) to react to data as it is generated. The real-time streaming service allows users to easily collect, process, and analyze data from various sources, including web and mobile applications, IoT devices, clickstreams, and more. The batch processing module 115 is configured to consume and process the streaming data in real time. A buffer batch size of the batch processing module 115 may be, for example, in the order of hundreds and more transmissions, depending on the size of the unit transition and the load handling capacity of the allocated batches.

A request-driven compute module 120 may be executed by a request-driven compute service, such as, for example, AWS™ Lambda which is a compute service provided by AWS™. The AWS™ Lambda allows developers to run code without provisioning or managing servers. With AWS Lambda, developers can write functions in a variety of programming languages and deploy them in the cloud, where they can be triggered automatically by various events or APIs. When using the request-driven compute module 120 and request-driven compute service, the operator of the service is charged only for the compute time consumed by functions executed which ensures a cost-effective way to run code that only needs to be executed periodically or in response to specific events. For example, when the request-driven compute module 120 is executed using AWS™ services, Lambda functions may be triggered by various AWS™ services, such, for example, API Gateway, Amazon S3, Amazon DynamoDB, Amazon Kinesis, and others. The request-driven compute module 120 executes instructions in response to specific events and request.

A flexible and scalable NoSQL database 140 (also referred to herein as a "database 140") may be, for example, an Amazon™ DynamoDB which may be provided by Amazon Web Services (AWS). The flexible and scalable NoSQL database 140 is configured to provide low-latency, high-throughput access to data. A NoSQL (Not only SQL) database is a type of database that is designed to handle unstructured or semi-structured data and is flexible. Unlike traditional relational databases, which use tables with rows and columns to store and manage data, NoSQL databases use a variety of data models such as key-value, document, column family, and graph to organize and store data.

The database 140 allows to store data using flexible data models, making it ideal for a wide range of use cases, including web and mobile applications, gaming, IoT, etc. The flexible and scalable NoSQL database 140, such as for example, DynamoDB, may be fully managed by an external service, such as, for example, AWS, which means that the operator of the system as described herein does not need to provide server maintenance, scaling, or backups. The database 140 is connected to the request-driven compute module 120.

A scalable analytics module 160 is executed at the scalable analytics service which is configured to provide a scalable and reliable solution for indexing, searching, and analyzing large volumes of data, such as, for example, AWS™ OpenSearch. For example, the AWS OpenSearch is a fully managed, open-source search and analytics service provided by AWS.

In operation, transaction data with initial transaction requests 202 is transferred to the system 100 from user computing devices 200 of financial institutions. The financial institutions may comprise, for example, banks, partners, and automated clearing house (ACH) which is a computer-based electronic network for processing transactions. Transaction requests are processed based on actual hit loads and are processed in the real time.

Still referring to FIG. 1, user computing devices 200 generate initial transaction requests 202 (also referred to herein collectively as "transaction data") that are transmitted to the system 100 through a communication network 210 (also referred to herein as a "network", which may be a public network, for example, such as Internet). The communication network 210 may be implemented, for example, as wide-area communication network, local communication network, a private, a public communication network, etc., or a combination or such networks. The system 100 receives the initial transaction requests 202 from the user computing devices 200.

Figure 2:
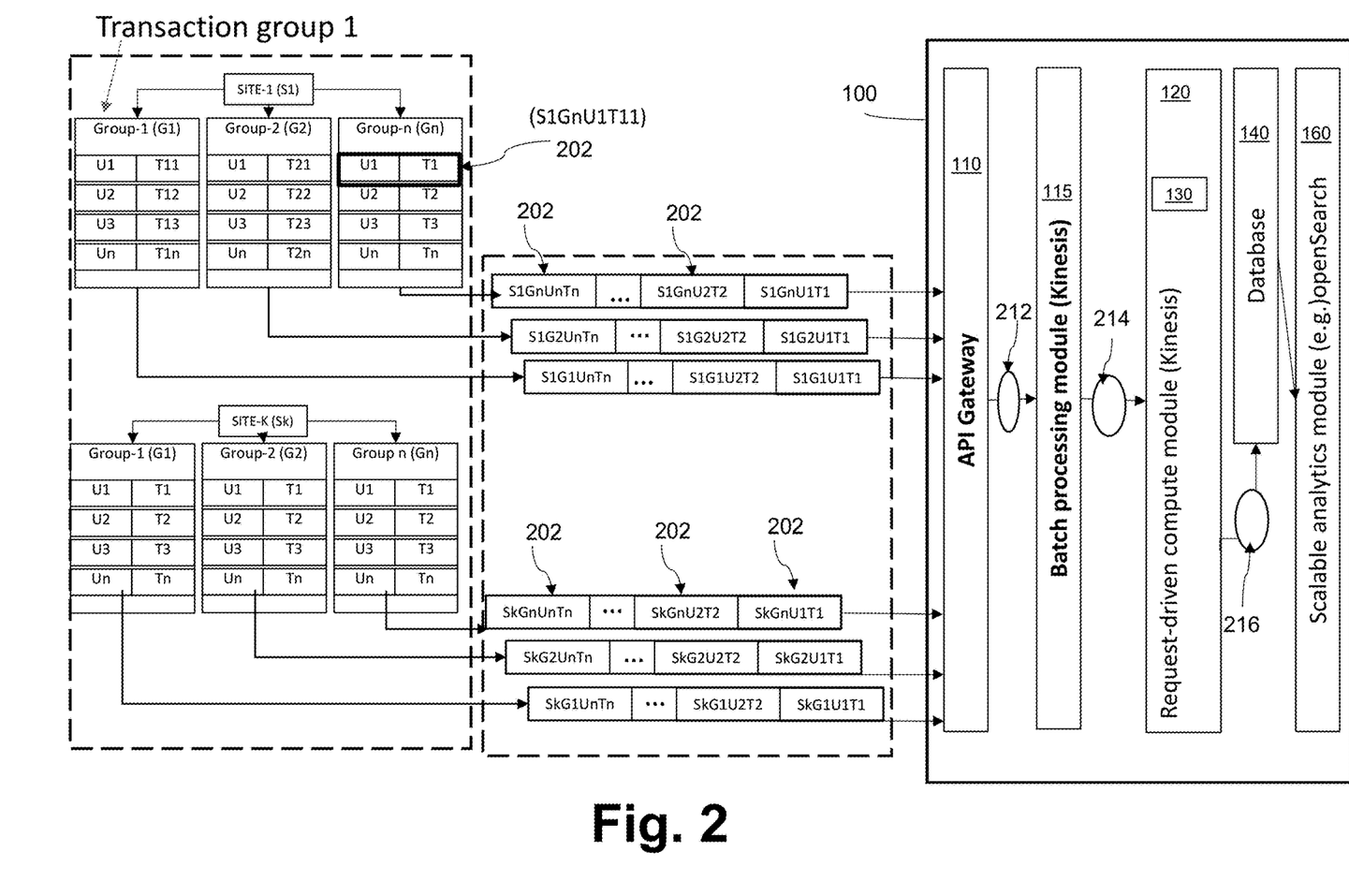
FIG. 2 illustrates further details of the operation of the system of FIG. 1, in accordance with at least one embodiment of the present disclosure.
Figure 3A:
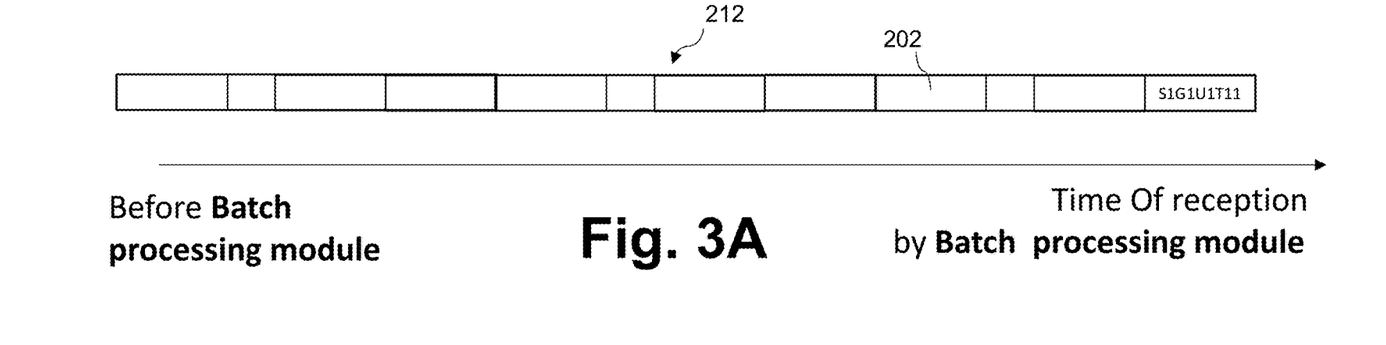
FIG. 3A illustrates a sequence of transaction requests as received by a batch processing module, in accordance with at least one embodiment of the present disclosure.
Figure 3B:
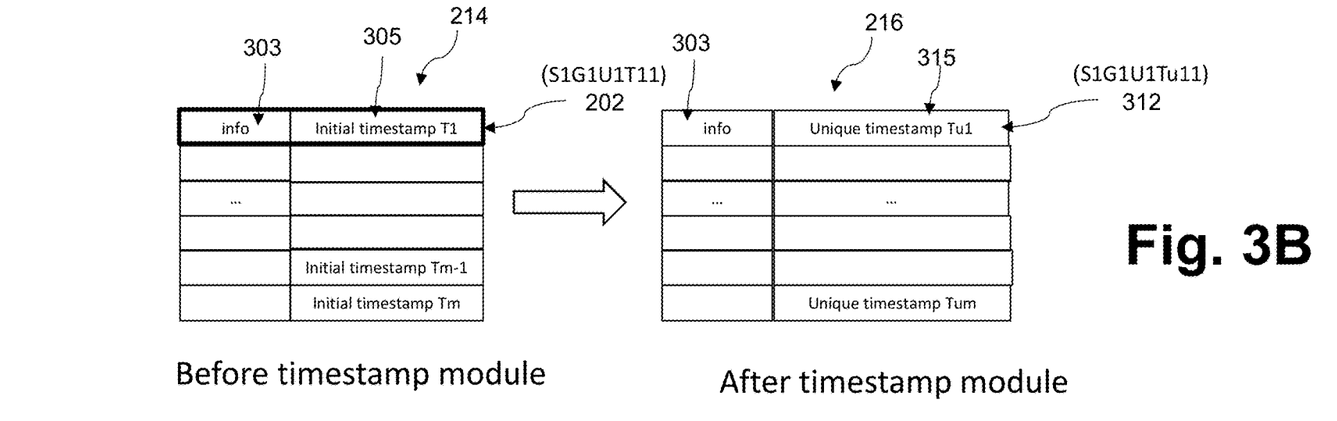
FIG. 3B illustrates an initial batch of transaction requests generated by a batch processing module, in accordance with at least one embodiment of the present disclosure.
Figure 3C:
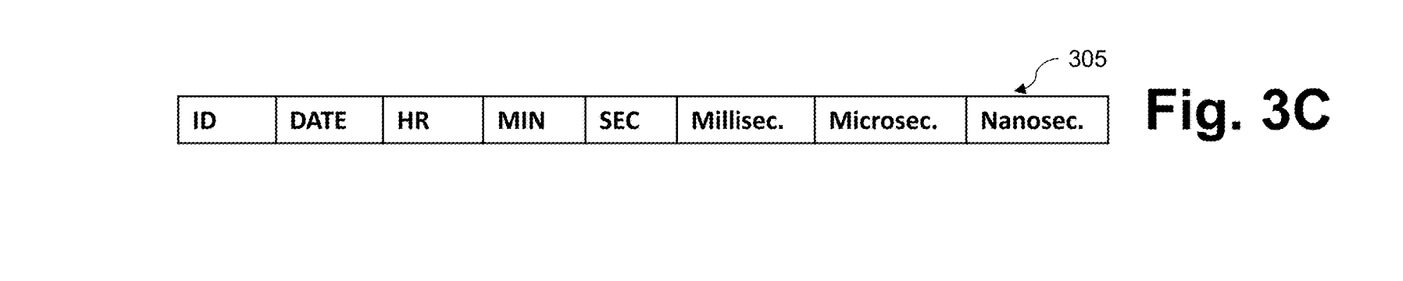
FIG. 3C illustrates a modified batch of transaction requests with transaction assigned with unique timestamps, in accordance with at least one embodiment of the present disclosure.

FIG. 2 illustrates further details of the operation of system 100, in accordance with at least one embodiment. Transaction data with initial transaction requests 202 is received from the user computer devices 200 by the system 100 via the network 210. As described below in further details, when a transaction is executed, the initial transaction request 202 is generated at a user computing device 200. Referring now also to FIGS. 3A-3C, the transaction request 202, comprises, in addition to a transaction identification and other details of transaction information 303, an initial transaction timestamp 305 (also referred to herein as an "initial timestamp 305"). A non-limiting example of such initial timestamp 305 is illustrated in FIG. 3C.

FIG. 2 illustrates transaction data with transaction requests 202 generated by various user computing devices 200 (indicated in transaction requests 202 FIG. 2 as "U1, U2, U3, . . . Un") at times T1, T2, T3, . . . Tn, respectively, for various sites S1 . . . Sk, and for various transaction groups G1 . . . Gn. With reference to FIG. 2, time of the transactions T1, . . . Tn may be identical for two or more transactions or may be different. User computing devices 200, indicated in the initial transaction requests 202 as U1, . . . Un, may be identical user computing devices 200 or different from each other. Sites S1, . . . Sk may be identical to each other or different from each other. Transaction groups G1, . . . Gn may be identical to each other or different from each other. Transaction requests (entries) may be grouped in transaction groups anywhere between 1 to 500 depending on the size of the transaction data. According to another embodiment, the transaction requests (entries) may be grouped in transaction groups anywhere between 1 to 1000 transaction requests or more. The transaction requests 202 may be grouped in transaction groups and then arrive to the receiving module 110.

In at least one embodiment, the initial transaction requests 202 are received by the receiving module 110 (which may be implemented, for example, using API Gateway) and then sent individually one after another, as received, and based on the first in first out (FIFO) logic, forming a sequence referred to herein as a "sequence of initial transaction requests 212" (sequentially) to the batch processing module 115 (such as, for example, Kinesis). The sequence of initial transaction requests 212 is illustrated in FIG. 3A.

The batch processing module 115 receives initial transaction requests 202 in the sequence of initial transaction requests 212 from the receiving module 110 and generates initial batches 214 by grouping the initial transaction requests 202 in each initial batch 214. The batch processing module 115 groups (batch-groups) the initial transaction requests 202 based on the first in first out (FIFO) logic and generates initial batches 214. In some embodiments, the batch processing module 115 may group the initial transaction requests 202 according to one or more predetermined criteria. Such predetermined criteria may be, for example, the number of initial transaction requests 202 in the batch, time period during which they were received, a target time period that may be provided by, for example, the administration device 220, etc.

The initial batches 214 are then received from the batch processing module 115, by request-driven computer module 120. The request-driven compute module 120 comprises a timestamp assignment module 130 which generates and assigns unique timestamps 315. The timestamp assignment module 130 is configured to assign-allocate, with a microsecond or nanosecond resolution, a unique timestamp 315 to each received transaction request 202 in the initial batch 214 to replace the initial timestamps 305 of each one of the received plurality of the initial transaction requests 202 of the initial batch 214. The initial timestamps 305 are replaced with the unique timestamp 315 for each transaction request 202 in each initial batch 214 received to generate an advanced batch 216. In other words, in at least one embodiment, an advanced batch may be generated based on the initial batch by replacing an initial timestamp of each initial transaction request by the unique timestamp, and the advanced batch is generated according to an order in which the initial transaction requests are sequenced in the initial batch. In at least one embodiment, the unique timestamp has the advanced precision of at least one microsecond, at least one nanosecond or higher. In at least one embodiment, the unique timestamp may have an advanced precision of at least 10 nanoseconds.

In at least one embodiment, the initial timestamp is replaced with a unique timestamp for each transaction request in each initial batch to generate an advanced batch according to an order in which the transaction requests are ordered in the initial batches using the timestamp assignment module. The unique timestamp may have an advanced precision of at least 1 nanosecond, the advanced precision of the unique timestamp being higher than an initial precision of the initial timestamp.

In at least one embodiment, each unique timestamp 315 is generated and assigned according to the order in which the initial transaction requests 202 are ordered (sequenced) in the initial batch 214. In at least one embodiment, the unique timestamp 315 has a precision of, for example, one thousand (1,000) microseconds (or nanoseconds) or better (in other words, in at least one embodiment, the unique timestamp 315 has higher resolution than microseconds, in the order of nanoseconds). The resolution of the unique timestamp 315 (also referred to herein as an "advanced time resolution of the unique timestamp") is greater (higher) than an initial time resolution of the initial timestamp 305.

NTP and UTC protocols may be used to generate and assign the initial timestamp to incoming transaction requests. In some embodiments, the initial timestamp may be assigned at/by the receiving module 110. The initial timestamp assigned at the receiving module 110 may be different from the transaction original timestamp assigned to the transaction request at the user computing devices 200.

Figure 4:
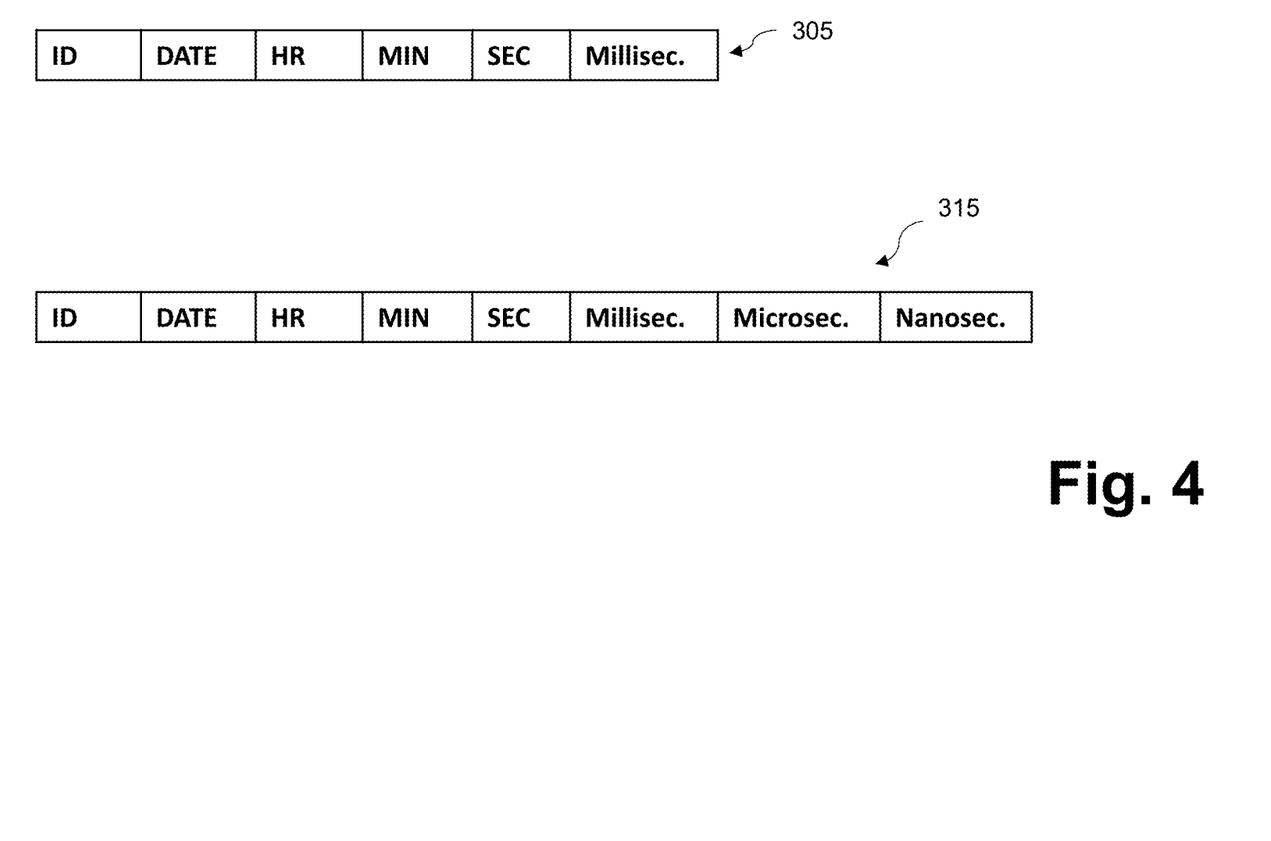
FIG. 4 schematically illustrates an initial timestamp and a unique timestamp, in accordance with at least one embodiment of the present disclosure.

The microsecond resolution and nanosecond resolution of fractional seconds are provided when generating the unique timestamp 315 and allocating each unique timestamp 315 to the associated modified transaction request 312. Referring now to FIG. 4, where the unique timestamp 315 is illustrated. The unique timestamp 315 comprises information about the date, hour, minutes, seconds, milliseconds, and nanoseconds.

The initial transaction requests 202 may have duplicate initial timestamps 305, because some transactions may be processed simultaneously and received close to each other in time by the receiving module 110. In addition, as all the timestamps are received close to each other, it may be impossible to assign different timestamps to two simultaneous transactions because the time resolution may not be enough to differentiate between two transactions. When processing the batches, transaction requests having the same (duplicate) initial timestamp 305 are distinguished (in other words, duplicates are distinguished) by high time resolution which has substantially small (infinitesimal) step between two closest timestamps, such as the step between the two closes timestamps is one or several microseconds and less (one or several nanoseconds, for example). In at least one embodiment, the at least one timestamp assignment module 130 may be further configured to detect the initial transaction requests that have duplicate initial timestamps.

When processing the initial batch 214, the timestamp module 130 may verify whether all transactions in the initial batch 214 have different timestamps. One of the conditions to assign the unique timestamps, may be the presence of two or more similar initial timestamps in the initial batch 214. Even though the transaction requests may have arrived at the receiving module 110 at time that may differ by nanoseconds, the time resolution of the receiving module 110 may not be enough to differentiate between these transaction requests.

In some embodiments, 1 nanosecond or 0.1 nanosecond or 10 nanoseconds may be added to the initial timestamps in order to differentiate two or more transaction requests with assigned initial timestamps that are identical.

In at least one embodiment, the request-driven compute module 120 may then add one or more digits at the end of the initial timestamp 305 to increase time resolution and obtain the unique timestamp 315. The request-driven compute module 120 may then analyse whether all transaction requests have different timestamps allocated, or there are still two or more transaction requests that have same timestamps. The request-driven compute module 120 may then proceed to further increasing the resolution of the timestamp assigned to the transaction requests, until all the timestamps in the advanced batch 216 have unique timestamps, therefore there is no two identical timestamps in one advanced batch 216.

As there are numerous transaction requests received and, in some embodiments, one million or more transactions may need to be processed per second, there may be more than one timestamp assignment module 130 in the request-driven compute module 120.

In at least one embodiment, a load balancing module 125 is configured to communicate with the timestamp assignment modules 130 and to distribute the transaction requests 202 in each initial batch 214 (or, in some embodiments, distribute batches) across multiple instances of the timestamp assignment module 130, such that the serverless architecture can handle at least (or more than) 1,000,000 transactions per second. In at least one embodiment, the load balancing module 125 is configured to dynamically adjust the distribution of the initial transaction requests 202 among the instances of the timestamp assignment module 130 based on the workload and availability of each timestamp assignment module 130. In at least one embodiment, the load balancing module is configured to distribute the initial batches with the initial transaction requests across the at least one timestamp assignment module, such that the serverless architecture processes at least 1,000,000 transactions per second. In at least one embodiment, the load balancing module distributes the initial batches to the at least one timestamp module according to availability of resources or in a round-robin fashion.

In at least one embodiment, when several transaction requests in one initial batch 214 are identical, the timestamp assignment module 130 may generate unique timestamps 315 with resolution higher than the resolution of the initial timestamps 305 by adding an additional number of digits to the initial timestamp 305, the additional number of digits may depend, for example, on the number of transaction requests with identical initial timestamps 305, to obtain the unique timestamps 315 for each transaction request. For example, if there are more than 10 transaction requests, more than one digit needs to be added to the initial timestamp to differentiate between these transaction requests.

The advanced batches 216 are saved in the database 140. As described above, each advanced batch 216 has unique timestamps 315 assigned to transaction requests, and no two transaction requests have two identical unique timestamps 315.

The scalable analytics module 160 retrieves the advanced batch 216 from the database 140 and analyses one or a plurality of the advanced batches 216 to determine, for example, the winner of a lottery competition, or a rewards competition (or rewards scheme) described herein. The system 100 may also comprise an administration device 220. Alternatively, the administration device 220 may be separate from the system 100. The scalable analytics module 160 communicates with the administration device 220 which may be a server and/or a cloud. The administration device 220 is configured to execute verifications of the modules of the system 100 and to request the analysis and to receive data analysis results from the scalable analytics module 160. The administration device 220 may provide to the system 100 a target time period during which it would like to receive perform data and information analysis and filtering of the transaction requests received. In at least one embodiment, the database operation module 135 is configured to generate a report of the unique timestamps and their corresponding transaction requests for a specified time period.

An atomic clock 180 or other nanosecond network time protocol (NTP) server is consulted by various modules of the system 100 with requests of synchronization. The atomic clock 180 provides the synchronization information to modules, including but not limited by timestamps modules 130. Although the atomic clock may help to determine the timestamps, the time resolution generated by the timestamp module 130 is higher than the time resolution that may be provided by the modules that would use only the atomic clock 180 or other nanosecond network time protocol (NTP) server, without the timestamp module 130.

For example, the transactions performed by the user computing devices 200 may need to be distinguished between each other for the purpose of determining a winner of a method, a competition, an event, lottery, and the similar where the winner is determined based on the time of the transaction. In some embodiments, each transaction in a batch of transactions needs to have a distinguished, unique timestamp 315 for another purpose. The system and the method as described herein help to distinguish such transactions.

In at least one embodiment, the time defragmentation to 100 nanosecond intervals may be sufficient with the present and real time design of number of visits when applied gradually starting with the North American population first. For example, the system may serve to the population of North America which is taken as 500 million inhabitants and visitors. The rush hour design of the system may consider that all of the population are users, and they may visit the website within one hour. The designed time requirements may be as follows: 500,000,000/3600=138,888 visitors per second. Similar estimations may be applied for Europe as being a second area of use of the system and method. Other parts of the world may be also considered.

The available hardware and software which manages the visits of 50,000 users per second for their financial transactions may necessitate four times this capacity for North America alone for user singular visits during nominated times, which means four different time data that need to be synchronized to UTC, NPT and other standard times to manage the transmission, receipt, confirmation and eventually the results, outcomes, rewards and similar end product cycle without leap, latency, noise and foggy backlash.

The system as described herein is configured to generate the unique timestamp. Described below are various embodiments of the present disclosure.

In at least one embodiment of the present disclosure, the generation of the unique timestamp is achieved due to assembling and putting together a special purpose server that produce precision time ticks in the range of microseconds and nanoseconds when needed. The precision time ticks in the range of nanoseconds are detectable by the special purpose server with the capacity of synchronizing with the ticks of the times of the transmission of the user's input. The special purpose server aligns the time ticks with a reference time like UTC and issues a time stamp which is in the range of microseconds as a start and then in the range of nanoseconds and down the stream further as necessitated by the growth of the present system and its application. There is thus created the unique timestamp for each of the unique users and transmitting the information as recorded at the times of the user-initiated ticks back to the users with a text message having all the unique information associated with the time stamp belonging to the unique user as initiated with his unique transmission of participation.

In at least one embodiment, a text message with the unique timestamp information is produced according to the format illustrated in FIG. 4.

In at least one embodiment, the unique timestamp comprises:
1. The ID of the user.
2. The date containing the year, the month, and the day.
3. The time in Hours and Minutes.
4. The seconds down to the microsecond-nanosecond fractions as initiated by the time transmission of the user which may be, for example, adjusted to a standard time to give the equal opportunity to all users and avoid confusion.

The unique timestamp as described herein is generated for the unique event (transaction) of the day. The unique timestamp may be the property of the unique user (user computing device) of the unique time of the unique day. In at least one embodiment, a time resolution server may generate the unique timestamp.

In at least one embodiment, the server (and/or a server farm or cluster) as described herein is a specially assembled and operated IT block configured to generate (create), record, reserve, and transmit timestamps with microsecond and nanosecond resolution. Such accuracy is currently and typically not used in financial transactions, social media networks, and applications, not in even in computers. Usual time stamps are in the order of seconds. For example, the times in text transmission, text messages WhatsApp messages (or other), emails, credit-debit card records and registrations are all registered and transmitted in seconds.

The sensitivity of the application as described herein is in the order of milliseconds, microseconds, and nanoseconds considering the peak hours of users input, which is expected in the order of the millions at certain times, imposes that those users are given a unique and only a unique time stamp which identifies the unique time of their input, as the outcomes, results, rewards, end products are classified and arranged in the order of the registered unique timestamps.

The use and the selling of the unique time stamps in an embodiment may be applied (achieved) by the transfer of the contribution of the users of the unitary value of the fund allocated to this system, with the objective of gathering deposits in allocated accounts, to allocated escrow accounts. In at least one embodiment, the special purpose server diffuses funds in the escrow account at a certain first percentage of these funds, equally amongst the owners of the best first, the best second and the best third timestamps closest to the seconds or other fractions of time of the nominated hours or more of the day. The special purpose server may eventually diffuse a second percentage of the funds gathered during the nominated hour of the day onto the first best, the second best and the third best stamps of the nominated hour, which is produced by an algorithm like averaging the first bests, the second bests and the third bests of the rewarded unique timestamps of the seconds of the nominated hours whereby, the first Best of the hour unique timestamp owner is rewarded with 50% of the another second percentage of the gathered funds, the second best of the hour timestamp owner is rewarded with 30% of another second percentage of the gathered funds, and the third best of the hour timestamp owner is rewarded with 20% of the another second percentage of the gathered funds.

To implement the above, a flawless, seamless, and user-friendly application may be developed to allow users to seamlessly join and initiate the transmission of subscription-contribution to the system and thus be eligible for a unique timestamp created uniquely for each of the unique users for the unique times of their choice.

In at least one embodiment, the users can access the application through laptops, computers, smartphones, Metas, NFTs, and other contemporary and public and media networks like Facebook, Amazon, Twitter, Instagram, and others and create an account with a unique dedicated password they are allowed to create for themselves through the website dedicated application.

For example, the users may need to be owners of certain real funds which can be deposited in any of the monetary service business providers, financial institutions, credit, and debit cards, and eventually can also chose to operate through the money service business facility that may be developed, operated and become the property of the present system.

In at least one embodiment, the users may insert their minimum identification requirements such as, for example, name, date of birth, father's name, place of birth, nationality, Zip Code, country and the similar which may be necessary to confirm their identity and a dedicated password of their choice to be used as access to the application for entry and use of the application. When the users are the winners of the rewards, the users may need to confirm their eligibility to such rewards and hence the safe transfer in order to credit their accounts with the countervalues of their winnings. This is especially true if the users are the winners of the "first best unique timestamp owners of the hour" and the "second best unique timestamp owners of the hour" and the "third best unique timestamp owners of the hour", whereby the rewards can be substantial and the verification, validation, eligibility and transfer of funds may be managed with extreme care by a particular password like the unique timestamp or the otherwise, generated and transmitted to the users by the special purpose server after verification and approval of their identity and eligibility. Furthermore, in at least one embodiment, the users are be asked to insert their dedicated and particular passwords into special cells in a format prior to the final approval before the transfer is initiated to the user's credit to protect the privacy and the interest of the users of the system and method and the associated application generating their unique timestamps.

The users are allowed to participate using the application with one time at a time contribution of the allocated value of the participation-contribution, but they are allowed several participations, and hence contributions, using the allocated contribution value during an allocated nominated time, second, minute of the hour. The users can choose to participate several times in the allocated times and hours per day and can participate at least sixty times within the minutes of the allocated nominated hours using the one time at the time contribution, the preset nominated value of the participation contribution.

Here is an example to explain the above participation scheme. A user is free to join with the first participation-contribution during the first minute of the nominated minute, and a second and a third time within the same minute provided that he joins with the one time at a time with the preset participation-contribution preset unit value like one USD—1.00 USD. The user is not allowed in this case to participate-contribute with 5.00 USD but he is allowed to join five times with the set value of 1.00 USD. This scheme may be applied for all the minutes of the nominated hour.

If a user would join the participation-contribution process with the one time at a time preset unit value for each minute of the hour, he would be able to join to the nominated hour participation-contribution to the nominated hour sixty times on a one time at a time basis or any number of times he wishes to join on a one time at a time during the nominated hour basis.

The application as described herein is easy to use and is user friendly in the following manner. The user downloads the application in his computer process-enabled facilities like laptops, computers, smartphones, tablets, and the like. The user inserts his information as required by the application which may have his name and other requirements as explained earlier in addition to his dedicated password, and links it to his funds as available in his financial facilities like credit, debit cards, bank accounts and other forms of financial funds and facilities at his possession and access.

For example, when the user wants to join the participation-contribution ongoing sessions around the clock, and at his time of choice, the user clicks the application icon to activate it. The application may require the user to insert his preset dedicated password that he chose as his private one during the time of his inserting his information at the registration as required by the application to create his unique and personal profile within the network of the application.

When the application is initiated after going through the verification of his identity as above, he may have to touch the join or other dedicated icon on the screen showing the application reading join or other dedicated icon. By touching the join or other dedicated icon, the preset nominated value is debited from his account of his choice and credited to the allocated Escrow accounts, of the user and the user joins the participation-contribution process at the time of his choice during the nominated minutes within the nominated hours. The user may be allowed to join as many times as he desires to do so to try and increase his chances of eligibility if he chooses to do so but always with the one time at a time basis.

After the using touching of the icon, the user initiates the transmission of his participation-contribution time to the data center processing server through the internet facility he is linked to and as such the data center operator server processes the application-participation transmission and registers the user's input and creates the unique timestamp to his unique participation-contribution time after adjusting his time to the internal clock of the operator server which is run with respect to a UTC-NPT or other reference times to regulate and unify the users times in line with the operator set reference times and accordingly transmits a text message to the user containing the information as related to his unique participation-contribution within the uniquely allocated running times in a format similar to:

| ID | DATE | HR | MIN | SEC | Millisec. | Microsec. | Nanosec. |
|---|---|---|---|---|---|---|---|

The transmitted text in a similar format as above contains, in at least one embodiment, the user's ID, Date, Time in Hours, minutes and the infinitesimals of the seconds of the unique timestamp as generated created by the operator server. This unique timestamp is the confirmation of the operator server that the user transaction is legitimate and accepted and that he may be in the team of eligible rewards identical to each and every eligible and legitimate user who receives such confirmation as their unique time stamps.

The initial first particular password at confirmation for the eligibility of the regular rewards of the first three types may be the digits of the seconds as registered on the transmitted initial unique timestamp. The user may be required to write down this sequence of digits as his eligibility password, after being notified by the operator server of such reward, and hence his eligibility to receive the regular type rewards of the first three types of rewards associated to this process which may be credited to his selected account after the completion of the initial dedicated password and the eligibility password exchange process are transmitted to the server as a two-step verification process. The best time of the hour eligible winners, in at least one embodiment, receive a special reward and a second particular password, generated by the server, after they receive their notice of their eligibility of their best of the hour special rewards. The users may use their second password as a two-step verification after the first step of verification, using the initial dedicated password transmitted to them at the time of the participation-contribution verification and confirmation. After successful log in of the two step verification, a third and final step of verification and eligibility may involve an identity verification of the eligible user through a short session of live communication during which several questions as related to his provided information at registration may be performed and an official ID, demonstrating the legal status of the eligible special rewards receiver's legal status, may be conducted by a dedicated person of the operator and the special reward credited to his account after all the above are met.

The objective of the above verifications is to safeguard the interests of the eligible reward receivers and warrant that their rights are protected, and the rewards are credited in an official and legitimate manner.

In the present description, the terms hereunder can be understood according to and in the context of the definitions given hereto.

Operator data and processing server (ODPS-DPS), also referred to herein as a "refund server" or an "Operator data communication and processing server" (ODCPS-DCPS): The server connected to a secure data communication and processing network which is controlled, managed, and configured by the operator of the purchase.

Server computer, or server: a computer device, or program on such a device, which provides functionality for other programs or devices, called clients. This architecture is called the client-server model, and a single overall computation is distributed across multiple processes or even on multiple devices for sharing load or according to functionality. Servers can provide various functionalities, often called "services", such as sharing data or resources among multiple clients, or performing computation for a client. A single server can serve multiple clients, and a single client can use multiple servers. A client process may run on the same device or may connect over a network to a server on a different device. Servers typically comprise a database, files, and can run applications and communicate over the web. Processing such as computing, the execution of operations, queries/requests by the user(s), preparation of responses, responses to queries to the client(s), retrieval of files, queries of database(s), etc., are all considered as a load for the server, which requires an amount of the limited computing processing power and working memory of the server and consumes energy and computing processing power and working memory in a datacenter/farm/cluster of servers which is also limited. Moreover, several of these operations, especially files and data in databases, require an amount of long-term memory which also requires hardware (memory), consumes energy and space as more devices are required. The server may be a single computer, or is most likely a plurality of computers working together in a single facility or over many facilities, by using cloud computing, where servers work in a delocalized network, virtual servers, server clusters, data centers, etc.

High Performance Computing (HPC), aggregating computing power, supercomputing, processing huge volumes of data at very high speeds using multiple computers and storage devices as a cohesive fabric, performance-intensive, individual nodes (computers) working redundantly together in a cluster (connected group) to perform massive amounts of computing in a short period of time are the characteristics of the special purpose server.

Embarrassingly parallel workloads: small, simple, and independent tasks that can be run at the same time, often with little or no communication between them. For example, a company might submit 100 million credit card records to individual processor cores in a cluster of nodes. Processing one credit card record is a small task, and when 100 million records are spread across the cluster, those small tasks can be performed at the same time (in parallel) at astonishing speeds.

Tightly coupled workloads: large and shared workload and break it into smaller tasks that communicate continuously, the different nodes in the cluster communicate with one another as they perform their processing.

Financial technology (fintech): Performing complex risk analyses, high-frequency trading, financial modeling, and fraud detection.

Retail: Analyzing massive amounts of customer-user data to provide more-targeted product recommendations and better customer service cluster full of servers, storage solutions, and other infrastructure that they manage and upgrade over time. Suffering a delay when demand surges, quickly ramp up or down as their needs change, leading-edge technologies that are specifically architected for HPC workloads, low-latency flash storage, lightning-fast RDMA networks, and enterprise-class security, optimal performance during peak periods of demanding workloads, extensive capacity, HPC workloads for a variety of users. In addition, their cloud service should be architected to deliver optimal performance even during peak periods, more computing power, and capacity for each.

The time between hitting send on your message and the message hitting a recipient's device is tricky to calculate and varies by message, provide delivery receipts, security and stability, aggregator have the reach to achieve maximum carrier throughput, clear metrics to provide delivery receipts, a platform with uptime issues, messages are accepted and distributed with top tier priority, plan and execute automated, personalized messaging that reach all or specific users with relevant messages on time.

An SMS API refers to a software integration interface that enables code to send short messages through an SMS API platform. SMS API for either HTTP, Java, C++, or PHP.

Security offerings: a verification API makes it simple to add phone verification to your web application.

API offers verification and two-factor authentication (over SMS) capabilities through their REST API. This is the perfect API for adding authentication into your mobile app with a verification code (via text message) and Send Verification Code.

SMS APIs allow developers to send and receive SMS text messages to users around the globe through their REST API to integrate SMS messages into Android or iOS mobile apps.

SMS API integration allows developers to utilize SMS providers to send and receive SMS text messages within their software, websites, or mobile applications having the following functions: Average Timestamps; Unique timestamp generator; Unique timestamp, unique user; Create unique time stamp; Notify the timestamp as authentication password along the nominated; Receive funds; Notify eligible users with rewards; Two step verification for community and regular rewards; Multistep verification for special rewards; Number of inputs per second; Averaging the minute with cluster users; Time clock setting-UTC, NTP protocols; Rewards structure settings; Rewards Structure implementations. For example, the rewards may be of different types, such as REGULAR, COMMUNITY, SPECIAL. In at least one embodiment, a method of diffusing of rewards in the system is as follows. In at least one embodiment, the first step of the method is to create the special purpose server to manage the traffic of the application. The traffic may be, for example, in the order of hundreds of thousands and eventually millions of user texts transmitting their contributions at nominated times and generating and transmitting the unique high-resolution timestamps and passwords packets for the eligibility each of the user instructions.

In at least one embodiment, the special purpose server may perform internal operations which may comprise:
 1. Receiving the transmittal text (TT) of the user contribution notification at time T and simultaneously registering time T.
 2. Confirming receipt of contribution of the TT.
 3. Depositing the contribution of the TT in the allocated ESCROW accounts.
 4. Notifying the user of receipt of his TT.
 5. Generating and transmitting the unique high resolution time stamp and password of TT at the nominated time to the user.
 6. Notifying the user of the created unique time stamp of the nominated time.
 7. Sorting the transmissions TT within the nominated fractions of time T.
 8. Classifying the outcomes, the results, COMMUNITY and REGULAR-rewards with time orders of the fractions of time T.
 9. Creating the average time and other algorithms of the nominated time T.
 10. Classifying the SPECIAL rewards of the average time of the nominated time T.

In at least one embodiment, the special purpose server may perform external operations which may comprise:
 1. Compiling all rewards of the nominated time T.
 2. Notifying eligible users of their rewards of the nominated time T.

3. For COMMUNITY rewards:
   a. Creating the unique first particular password of the eligible winner.
   b. Notifying the eligible winner of their unique passwords.
   c. Conducting the twostep verification of eligibility made of:
      i. Receiving the user dedicated password.
      ii. Receiving the unique password of step 3a.
   d. Crediting the eligible user with the value of their rewards.
4. For REGULAR rewards:
   a. Creating the unique first particular password of the eligible winner.
   b. Notifying the eligible winner of their unique passwords.
   c. Conducting the twostep verification of eligibility made of:
      i. Receiving the user dedicated password.
      ii. Receiving the unique password of step 3a.
      iii. Receiving the account, the user wishes to have his reward credited to.
   d. Crediting the eligible user with the value of their rewards to their accounts.
   e. Notifying the user of their reward transfer details.
5. For SPECIAL rewards:
   a. Creating the unique first and second particular password of the eligible winner.
   b. Notifying the eligible winner of their unique passwords.
   c. Conducting the multistep verification of eligibility made of:
      i. Receiving the user dedicated password.
      ii. Receiving the dedicated unique first and second particular passwords.
      iii. Conducting a one-to-one session.
      iv. Verifying a legal ID with photo.
      v. Receiving the account, the user wishes to have his reward credited to.
      vi. Verifying the account details with the relevant financial institutions.
   d. Crediting the eligible user with the value of their rewards to their accounts.
   e. Receiving confirmation from the financial institution of funds being credited to the user account.
   f. Final verification of things being in order.
   g. Notifying the user of their rewards being deposited to their selected account.

A high-resolution timer and an NTP interface computer network which receives users notifications, simultaneously validates legitimacy and eligibility of the users and their notifications and associates the user notification initiation times with the server high resolution co-temporal times data, adjusts latency, creates, records and registers and reserves a dedicated unique high resolution time stamp allocated to the user notification packet made of the user details, the user notification date, time and the unique high resolution time stamp in an encrypted mode, classifies in allocated entries and files in the computer network and transmits the packet in encrypted mode, code, QR or other, to the initiating user with a password made of the last digits of the unique time stamp, needed for a two-step verification of user identity required for eventual reward eligibility protocols.

The special service server is special because it:
Step-1—
1. Has a high-speed CPU.
2. Receives an instruction.
3. Reserves a dedicated unique time stamp.
4. Verifies the identity of the user.
5. Verifies the password of the user.
6. Verifies availability of funds in the user account.
7. Transfers the one at a time amount to the escrow.
8. Generates the nominated unique particular passwords of the instruction.
9. Composes the user packet of his unique instruction.
10. Transmits the eligibility and legitimacy of the instruction to the user.

Step-2—
11. Classifies the instruction.
12. Creates the average time or other time algorithms.
13. Creates the cluster of the instructions.
14. Completes the nominated time instructions.
15. Tabulates the reward eligible users.
16. Notifies the eligible winners.

Step-3—
17. Receives a second notification of the user of accepting the reward.
18. Conducts the two-step verification of the eligible community and regular candidates.
19. Transfers the community rewards.
20. Transfers the regular rewards.

Step-4
21. Receives a second notification of the user accepting the special reward.
22. Conducts the verifications of special reward candidates.
23. Organizes the one-to-one verification process.
24. Conducts the one-to-one verification process.
25. Supervises the safe transfer of the special rewards.

Step-5—
26. Creates the data base of the above steps.
27. Archives the process data of the nominated singularity time.
28. Archives the process data of the nominated plurality times.

Step-6—
29. Responds to user queries and claims.
30. Verifies and checks queries and claims.
31. Responds to queries and settles claims.

According to an embodiment, the special purpose server generates unique high resolution time stamp simultaneously associated to the unique user initiated initial notification times at the interface of sequential high resolution time pairs.

According to an aspect, the method comprises adjusting the latency of the between the initial unique notification time of the unique user with NTP and server timer protocols.

According to an aspect, the method comprises simultaneously validating the legitimacy and the eligibility of the user and his initiated unique notification by ID and financial capability verifications.

According to an aspect, the method comprises simultaneously receiving the unique user initial unique notification time, verifying, and validating user ID and financial capability legitimacy and eligibility and producing a unique high resolution time stamp associated to the unique user initiated notification time.

According to an aspect, the method comprises transmitting to the unique user initiating the notification of the high-resolution unique time his eligibility to the ownership of the special purpose server produced unique high resolution time stamp pack along with the particular password associated to the pack required for a two-step verification along with his dedicated password as created by the user for his eligibility.

According to an aspect, there is provided a method of providing a dedicated application which users activate to contribute and participate in the production of their high-resolution unique time stamps which further results in the eligibility of the user to receiving rewards.

According to an embodiment, there is provided a dedicated application whereby the application is made of a system which can transmit the notification of the unique user and the associated initial unique time to the special purpose server.

According to an aspect, the application is downloaded to the unique user's laptop, smart phone and other internet communication and media facilities capable of transmitting the unique user's unique initial notification time to the special purpose server.

According to an aspect, an icon is allocated in the application and initiates the process of initiating the unique high-resolution notification of the unique user which requires that the unique user clicks on the icon such that the application pop ups the requirements to initiate and transmit the initial unique notification of the unique user to the special purpose server.

According to an aspect, the method comprises clicking the transmission initiation icon whereby the application pops up two further icons which require the user to record his dedicated password and his confirmation of participation-contribution fee of the transmission initiation.

According to an aspect, the method comprises confirmation of the user.

According to an aspect, the method comprises transmitting the confirmation by the user.

According to an aspect, the method comprises receiving validation of the transmission.

According to an aspect, the method comprises receiving the unique initial time stamp encrypted pack and the dedicated and particular passwords.

According to an aspect, the method comprises producing the eligible and legitimate reward owners.

According to an aspect, the method comprises transferring community rewards.

According to an aspect, the method comprises transferring regular rewards.

According to an aspect, the method comprises transferring special rewards.

The special purpose server has to have a high-speed CPU with precision and high-resolution base clocks in the order of GHZ as the probability of user notifications and clusters can be concentrated at certain times creating an initial traffic load which is multiplied due to the steps of the process which are requires to complete a cycle of nominated time.

According to an aspect, the method comprises using high speed computers with CPU base clocks in the order of GHZ and necessitates the synchronization of several network and redundant computers to manage instantaneous exceptional traffic and warrant the credible and accurate implementation of the process with high resolution precision due to the sensitivity of the instruction input times and the registration, reservation and completing the cycle of the process in a reliable, accurate and credible manner.

In at least one embodiment, the special purpose server generates, registers and reserves a dedicated and unique high resolution time stamps simultaneously at the transmission times initiated by the users in the order of at least microseconds, verifies and authenticates the legitimacy and the eligibility of each and every individual user instruction by multi step verification based on the ID, the dedicated password and the availability of funds and their transfer to the dedicated escrow and generates the particular passwords for further verification of rewards eligibility and sorts this in a dedicated and unique packet being the property of the unique user who initiated the transmittal of his unique instruction of the nominated hour. These steps are not generic DO-IT steps as the verification and authentication process is a step-by-step verification process for each and very user for each and every of their unique instructions. These steps and the eventuality of concentrated traffic and the process steps requires a network of synchronized computers that tackle the traffic of user transmissions independently, collectively and in redundantly parallel configurations that make the special purpose server a special.

The particularity of registering and reserving a unique high-resolution time stamp and an associated dedicated unique password pair characterize the validity and the authenticity of the initiated and transmitted unique user instruction and create a unique identity to the instruction which can be only created after the multistep verification and authentications related to the unique instruction producing and transmitting a unique packet containing the details of the process which can also be transmitted as a unique QR code that uniquely identify and qualify the initial instruction to reward eligibility.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A system having a serverless architecture for assigning unique timestamps, the system comprising:
a receiving module configured to receive and to sequence initial transaction requests with a first in first out (FIFO) logic, the initial transaction requests having assigned initial timestamps;
a batch processing module configured to batch-group the initial transaction requests into initial batches based on the FIFO logic;
at least one timestamp assignment module configured to assign a unique timestamp to each transaction request of the initial batch and to generate an advanced batch based on the initial batch by replacing an initial timestamp of each initial transaction request by the unique timestamp, the advanced batch being generated according to an order in which the initial transaction requests are sequenced in the initial batch, and an advanced time resolution of the unique timestamp being greater than an initial time resolution of the initial timestamp; and
a load balancing module configured to distribute the initial batches with the initial transaction requests across the at least one timestamp assignment module, such that the serverless architecture processes at least 1,000,000 transactions per second.

2. The system of claim 1, wherein the unique timestamp has an advanced precision of at least one nanosecond.

3. The system of claim 1, wherein the load balancing module distributes the initial batches to the at least one timestamp module according to availability of resources or in a round-robin fashion.

4. The system of claim 1, wherein the batch processing module is further configured to group the initial transaction requests in each initial batch according to one or more predetermined criteria.

5. The system of claim 1, wherein the load balancing module is further configured to dynamically adjust the distribution of the initial transaction requests among the at least one of the timestamp assignment module based on a workload and availability of each timestamp assignment module.

6. The system of claim 1, further comprising a database operation module which is configured to generate a report of the unique timestamps and their corresponding transaction requests for a specified time period.

7. The system of claim 1, wherein a buffer batch size of the batch processing module is in the order of hundreds and more transmissions depending on the size of a unit transition and a load handling capacity of allocated batches.

8. The system of claim 1, wherein the at least one timestamp assignment module is further configured to detect the initial transaction requests that have duplicate initial timestamps.

9. A method for assigning unique timestamps to transaction requests in a serverless architecture comprising:
  receiving a plurality of transaction requests each having an initial timestamp;
  batching the initial transaction requests into initial batches using a batch processing module;
  distributing the initial batches to at least one timestamp assignment module using a load balancing module; and
  replacing the initial timestamp with a unique timestamp for each transaction request in each initial batch to generate an advanced batch according to an order in which the transaction requests are ordered in the initial batches using the timestamp assignment module, wherein the unique timestamp has an advanced precision of at least 1 nanosecond, the advanced precision of the unique timestamp being higher than an initial precision of the initial timestamp.

10. The method of claim 9, wherein the unique timestamp has an advanced precision of at least 10 nanoseconds.

11. The method of claim 9, further comprising distributing the initial batches to the at least one timestamp module according to availability of resources or in a round-robin fashion.

12. The method of claim 9, further comprising grouping the transaction requests in each initial batch according to one or more predetermined criteria.

13. The method of claim 9, further comprising dynamically adjusting the distribution of the transaction requests among timestamp assignment modules based on a workload and availability of each timestamp assignment module.

14. The method of claim 9, further comprising generating a report of the unique timestamps and their corresponding transaction requests for a specified time period.

15. The method of claim 9, wherein a buffer batch size of the batch processing module is in the order of hundreds and more transmissions depending on the size of a unit transition and a load handling capacity of allocated batches.

16. The method of claim 9, wherein the at least one timestamp assignment module is further configured to detect the initial transaction requests that have duplicate initial timestamps.

17. A system having a serverless architecture for assigning unique timestamps, the system comprising:
  a receiving module configured to sequence initial transaction requests, where the initial transaction requests have assigned initial timestamps with an initial time resolution;
  a batch processing module configured to group the initial transaction requests into initial batches; and
  a timestamp assignment module configured to assign a unique timestamp to at least initial transaction requests that have duplicate initial timestamps, wherein the unique timestamps have an advanced time resolution which is greater than the initial time resolution.

* * * * *